(12) United States Patent
Yana Motta et al.

(10) Patent No.: US 9,394,469 B2
(45) Date of Patent: Jul. 19, 2016

(54) LOW GWP FLUIDS FOR HIGH TEMPERATURE HEAT PUMP APPLICATIONS

(71) Applicant: Honeywell International Inc., Morristown, NJ (US)

(72) Inventors: Samuel F. Yana Motta, East Amherst, NY (US); Mark W. Spatz, East Amherst, NY (US); Ankit Sethi, Tonawanda, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 150 days.

(21) Appl. No.: 14/193,662

(22) Filed: Feb. 28, 2014

(65) Prior Publication Data

US 2014/0260382 A1    Sep. 18, 2014

Related U.S. Application Data

(60) Provisional application No. 61/783,787, filed on Mar. 14, 2013.

(51) Int. Cl.
*C09K 5/04*    (2006.01)

(52) U.S. Cl.
CPC ............ *C09K 5/045* (2013.01); *C09K 2205/122* (2013.01); *C09K 2205/126* (2013.01); *C09K 2205/22* (2013.01)

(58) Field of Classification Search
CPC ............ C09K 5/04; C09K 5/045; F25B 9/006
USPC .................................. 252/67, 68, 69; 62/467
See application file for complete search history.

(56) References Cited

U.S. PATENT DOCUMENTS

2007/0007488 A1 *    1/2007    Singh ...................... C07C 19/08
                                                                252/68

FOREIGN PATENT DOCUMENTS

| EP | 2778206 A1 * | 9/2014 | ............ C09K 5/045 |
| WO | WO 2007126414 A2 * | 11/2007 | ............ A62D 1/0057 |
| WO | WO 2009089511 A2 * | 7/2009 | ............... C08J 9/144 |

* cited by examiner

*Primary Examiner* — Douglas McGinty
(74) *Attorney, Agent, or Firm* — Colleen D. Szuch

(57) ABSTRACT

The present invention relates, in part, to heat transfer compositions, and associated systems and methods, which include a first composition selected from the group consisting of HFO-1233zd, HFC-245fa, and combinations of these; and optionally, a second composition selected from the group consisting of HFO-1234ze, HFC-134a, and combinations of these.

11 Claims, No Drawings

LOW GWP FLUIDS FOR HIGH TEMPERATURE HEAT PUMP APPLICATIONS

CROSS REFERENCE TO RELATED APPLICATIONS

The present application claims priority to U.S. Provisional Application Ser. No. 61/783,787, filed Mar. 14, 2013, the contents of which are incorporated herein by reference in its entirety.

FIELD OF THE INVENTION

This invention relates to compositions, methods and systems having utility in heat transfer applications, with particular benefit in medium or high temperature heat pump applications, and in particular aspects to heat transfer and/or refrigerant compositions for replacement of refrigerant CFC-114 for heating and cooling applications and to retrofitting medium or high temperature heat pump systems. It also includes new systems designed for such new heat transfer and/or refrigerant fluids.

BACKGROUND

High temperature heat pumps have been used to upgrade low-grade thermal energy, such as that derived from air, soil, surface water or underground water, geothermal energy, solar energy, and industrial exhaust heat and process streams, to high-grade thermal energy via thermodynamic cycle. A heat pump system has a compressor that imparts energy to the low-grade thermal stream. Heat pump systems use a working fluid, i.e., a refrigerant, to facilitate the generation and transfer of heat over the thermodynamic cycle. Heat pump systems have been used for both heating and cooling purposes.

Historically, chlorofluorocarbons such as trichlorofluoromethane (CFC-11), 1,1,2-trichlorotrifluoroethane (CFC-113) and 1,2-dichloro-1,1,2,2-tetrafluoroethane (CFC-114) were used as working fluids in heat pumps, refrigerators, and other heating/cooling devices and machines. Due to elevated levels of Ozone Depletion Potential (ODP) and Global Warming Potential (GMP) the foregoing working fluids exhibit, their use has largely ended.

Chlorofluorocarbons have been replaced in heating and cooling applications by other working fluids that exhibit lower ODP and GWP, such as hydrochlorofluorocarbons and trydrofluorocarbons. Such working fluids include chlorodifluoromethane (R-22), R-407C, R-410A, R-245fa, and 1,1,1,2-tetrafluoroethane (R-134a). R-407C is a blend of difluoromethane (R-32), 2-chloro-1,1,1,2-tetrafluoroethane (R-124), R-134a, 1-Chloro-1,1-difluoroethane (R142b). R-410A is a blend of R-22 and pentafluoroethane (R-125).

The replacement working fluids do not provide the same operating range in middle to high heating temperatures that chlorofluorocarbon working fluids do. Of particular interest are middle-high temperatures, i.e., condensing temperatures from 70° C. to 100° C. and high temperatures, i.e., condensing temperatures greater than 100° C. For instance, with R22, R407c and R410A, the highest condensing temperature is 65° C. For R134a, the highest condensing temperature attainable is 73° C. When condensing temperatures exceed the limit, cycle performance deteriorates and risk of accidents increase due to excessive discharge pressures and temperatures (from the compressor).

It would be desirable to have a working fluid that exhibits low ODP and GWP and provides excellent thermal performance in the middle a id high temperature ranges, particularly in middle-high condensation temperature range of 70° C. to 100° C. or at the high condensation temperature range of greater than 100° C. It would be further desirable to have a working, fluid that is useful in heat pump systems and other heating/cooling machines such as air-conditioning systems and chillers.

SUMMARY

In certain aspects, the present invention relates to compositions, methods, uses and systems which comprise or utilize a multi-component mixture including a heat transfer composition that includes (1) from about 60% to less than about 100% by weight of a first composition selected from the group consisting of HFO-1233zd, HFC-245fa, and combinations of these; and (2) from greater than about 0% to about 40% by weight of a second composition selected from the group consisting of HFO-1234ze. HFC-134a, and combinations of these; provided that the amount of components (a) and (b) are effective to improve one or more of glide of the composition; capacity of the composition; and efficiency of the composition.

In certain non-limiting aspects, the first component includes HFO-1233zd, which in certain embodiments may comprise, consist essentially of or consist of HFO-1233zd (E). In certain aspects of such embodiments, HFO-1233zd may be provided with HFO-1234ze. To this end, in certain embodiments such compositions include from about 60 wt. % to about 85 wt. % of HFO-1233zd and from about 15 wt. % to about 40 wt. % of HFO-1234ze. In further aspects, such compositions include from about 65 wt. % to about 85 wt. % of HFO-1233zd and from about 15 wt. % to about 35 wt. % of HFO-1234ze. In even further aspects, such compositions include from about 70 wt. % to about 85 wt. % of HFO-1233zd and from about 15 wt. % to about 30 wt. % of HFO-1234ze. In even further aspects, such compositions include from about 85 wt. % to less than about 100 wt. % of HFO-1233zd and from greater than about 0 wt. % to about 15 wt. % of HFO-1234ze.

In further aspects of the present invention, HFO-1233zd may be provided with HFC-134a. To this end, in certain embodiments such compositions include from about 60 wt. % to about 85 wt. % of HFO-1233zd and from about 15 wt. % to about 40 wt. % of HFC-134a. In further aspects, such compositions include from about 65 wt. % to about 85 wt. % of HFO-1233zd and from about 15 wt. % to about 35 wt. % of HFC-134a. In even further aspects, such compositions include from about 70 wt. % to about 85 wt. % of HFO-1233zd and from about 15 wt. % to about 30 wt. % of HFC-134a. In even further aspects, such compositions include from about 85 wt. % to less than about 100 wt. % of HFO-1233zd and from greater than about 0 wt. % to about 15 wt. % of HFC-134a.

In certain non-limiting aspects, the first component includes HFC-245fa which may be provided with HFO-1234ze. In certain embodiments, such compositions may include from about 60 wt. % to about 87 wt. % of HFC-245fa and from about 13 wt. % to about 40 wt. % of HFO-1234ze. In further aspects, such compositions include from about 60 wt. % to about 85 wt. % of HFC-245fa and from about 15 wt. % to about 40 wt. % of HFO-1234ze. In even further aspects, such compositions include from about 70 wt. % to about 85 wt. % of HFC-245fa and from about 15 wt. % to about 30 wt. % of HFO-1234ze. In even further aspects, such compositions include from about 85 wt. % to less than about 100 wt. % of HFC-245fa and from greater than about 0 wt. % to about 15 wt. % of HFO-1234ze.

In further aspects of the present invention, HFC-245fa may be provided with HFC-134a. To this end, in certain embodiments such compositions include from about 60 wt. % to about 87 wt. % HFC-245fa and from about 13 wt. % to about 40 wt. % of HFC-134a. In further aspects, such compositions include from about 60 wt. % to about 85 wt % of HFC-245fa and from about 15 wt. % to about 40 wt. % of HFC-134a. In even further aspects, such compositions include from about 70 wt. % to about 85 wt. % of HFC-245fa and from about 15 wt. % to about 30 wt. % of HFC-134a. In even further aspects, such compositions include from about 85 wt. % to less than about 100 wt. % of HFC-245fa and from greater than about 0 wt. % to about 15 wt. % of HFC-134a.

The term HFO-1234ze is used herein generically to refer to 1,1,1,3-tetrafluoropropene, independent of whether it is the cis- or trans-form. The terms "cisHFO-1234ze" (also referred to as HFO-1234ze(Z)) and "transHFO-1234ze" (also referred to as HFO-1234ze(E)) are used herein to describe the cis- and trans-forms of 1,1,1,3-tetrafluoropropene respectively. The term "HFO-1234ze" therefore includes within its scope cisHFO-1234ze, transHFO-1234ze, and all combinations and mixtures of these. In certain preferred aspects, the HFO-1234ze comprises, consists essentially of or consists of transHFO-1234ze (i.e. HFO-1234zd(E)).

The term HFO-1233zd is used herein generically to refer to 1-chloro-3,3,3-trifluoropropene, independent of whether it is the cis- or trans-form. The terms "cisHFO-1233zd" (also referred to as HFO-1233zd(Z)) and "transHFO-1233zd" (also referred to as HFO-1233zd(E)) are used herein to describe the cis- and trans-forms of 1-chloro-3,3,3-trifluoropropene, respectively. The term "HFO-1233zd" therefore includes within its scope cisHFO-1233zd, transHFO-1233zd, and all combinations and mixtures of these. In certain preferred aspects, the HFO-1234ze comprises, consists essentially of, or consists of transHFO-1233zd.

The present invention provides also methods and systems which utilize the compositions of the present invention, including methods and systems for transferring heat, and methods and systems for replacing an existing heat transfer fluid in an existing heat transfer system, and methods of selecting a heat transfer fluid in accordance with the present invention to replace one or more existing heat transfer fluids. While in certain embodiments the compositions, methods, and systems of the present invention can be used to replace any known heat transfer fluid, in further, and in some cases preferred embodiments, the compositions of the present application may be used as a replacement for CFC-114, particularly though not exclusively in medium to high temperature heat pump systems.

Additional embodiments and advantages will be readily apparent to one of skill in the art on the basis of the disclosure provided herein.

DETAILED DESCRIPTION OF PREFERRED EMBODIMENTS

CFC-114 is commonly used in refrigerant and heat pump systems, particularly heat pump systems having medium to high heating temperatures. It has an estimated Global Warming; Potential (GWP) of 10,000, which is much higher than is desired or required. Applicants have found that the compositions of the present invention satisfy in an exceptional and unexpected way the need for new compositions for such applications, particularly though not exclusively heat pinup systems, particularly those having medium to high heating temperatures, having improved performance with respect to environmental impact while at the same time providing other important performance characteristics, such as, but not limited to, capacity, efficiency, glide, flammability and toxicity. In preferred embodiments the present compositions provide alternatives and/or replacements for working fluids currently used in such applications, particularly and preferably CFC-114, that at once have lower GWP values and have a close match in capacity to CFC-114 in such systems.

Heat Transfer Compositions

The compositions of the present invention are generally adaptable for use in heat transfer applications, that is, as a heating and/or cooling medium, but are particularly well adapted for use, as mentioned above, in heat pump systems that have heretofor used CFC-114.

Applicants have found that use of the components of the present invention within the stated ranges is important to achieve the important but difficult to achieve combinations of properties exhibited by the present compositions, particularly in the preferred systems and methods.

In certain embodiments, the compositions of the present invention include a first component selected from 1-chloro-3,3,3-trifluoropropene (HFO-1233zd), 1,1,1,3,3-pentafluoropropane (HFC-245fa), and combinations thereof. In certain preferred aspects the HFO-1233zd comprises, consists essentially of, or consists of trans-HFO-1233zd or HFO-1233zd (E). The compositions of the present invention also include a second component selected from 1,3,3,3-tetrafluoropropene (HFO-1234ze), 1,1,1,2-tetrafluoroethane (HFC-134a), and combinations thereof.

The first component may be provided in amount from about 40 wt. % to about or less than 100 wt. % and the second component may be provided in an amount from about or greater than 0 wt. % to about 60 wt. %. In further aspects, the first component may be provided in amount from about 60 wt. % to about or less than 100 wt. % and the second component may be provided in an amount from about or greater than 0 wt. % to about 40 wt. %.

As contemplated by the foregoing, in certain aspects of the present invention, one or more of the first components may be provided alone or with one or more of the second components. To this end, combinations of the first and second components may include, but are not necessarily limited to, (1) HFO-1233zd with either or both of HFO-1234ze and/or HCE-134a: (2) HFC-245fa with either or both of HFO-1234ze and/or HCE-134a: (3) HFO-1233zd and HFC-245fa with either HFO-1234ze or HCE-134a: (4) and HFO-1233zd and HFC-245fa with both HFO-1234ze or HCE-134a.

In certain embodiments, the first component comprises, consists of or consists essentially of HFO-1233zd, and in certain preferred aspects comprises, consists essentially of or consists of HFO-1933zd(E). HFO-1233zd may be provided in amount from about 40 wt. % to about or less than 100 wt. % and, in certain preferred embodiments from about 60 wt. % to about or less than 100 wt. %. In further aspects, such as when HFO-1233zd is used as a component to retrofit an existing system used for CFC-114, it may be provided in an amount from about 60 wt. % to about 85 wt. %, in certain aspects from about 65 wt. % to about 85 wt. %, and in further aspects, in an amount from about 70 wt. % to about 85 wt. %. In further aspects, such as when HFO-1233zd is used as a component for a new system replacing an existing CFC-114-based system, it may be it may be provided in an amount from about 85 wt. % to about or less than 100 wt. %.

In further embodiments, the first component comprises, consists of or consists essentially of HFC-245fa. HFC-245fa may be provided in amount from about 40 wt. % to about or less than 100 wt. % and, in certain preferred embodiments from about 60 wt. % to about or less than 100 wt. %. In further aspects, such as when HFC-245fa is used as a component to retrofit an existing system used for CFC-114, it may be provided in an amount from about 60 wt. % to about 87 wt. %, in certain aspects from about 60 wt. % to about 85 wt. %, and in further aspects, in an amount from about 70 wt. % to about 85 wt. %. In further aspects, such as when HFC-245th is used as a component for a new system replacing an existing CFC-114-based system, it may be it may be provided in an amount from about 85 wt. % to about or less than 100 wt. %.

In further embodiments, the second component comprises, consists of or consists essentially of HFO-1234ze, and in certain preferred aspects comprises, consists essentially of, or consists of HFO-1234ze (E). HFO-1234ze may be provided in amount from about or greater than 0 wt. % to about 60 wt. % and, in certain preferred embodiments from about or greater than 0 wt. % to about 40 wt. %. In further aspects, such as when HFO-1234ze is used as a component retrofit an existing system used for CFC-114, it may be provided in an amount from about 13 wt. % to about 40 wt. % in certain aspects from about 15 wt. % to about 40 wt. %, and in further aspects, in an amount from about 15 wt. % to about 35 wt. %. In further aspects, such as when HFO-1234ze is used as a component for a new system replacing an existing CFC-114-based system, it may be it may be provided in an amount from about or greater than 0 wt. % to about 15 wt. %.

In further embodiments, the second component comprises, consists of, or consists essentially of HFC-134a. HFC-134a may be provided in amount from about or greater than 0 wt. % to about 60 wt. % and, in certain preferred embodiments from about or greater than 0 wt. % to about 40 wt. %. In further aspects, such as when HFC-134a is used as a component to retrofit an existing system used for CFC-114, it may be provided in an amount from about 13 wt. % to about 40 wt. %, in certain aspects from about 15 wt. % to about 35 wt. %, and in further aspects, in an amount from about 15 wt. % to about 30 wt. %. In further aspects, such as when HFC-134a is used as a component for a new system replacing an existing CFC-114-based system, it may be it may be provided in an amount from about or greater than 0 wt. % to about 15 wt.

In certain preferred aspects, HFO-1233zd, and in certain embodiments HFO-1233zd(E), is provided alone or in combination with HFO-1234ze. In such aspects, HFO-1233zd may be provided in an amount from about 60 wt. % to less than about 100 wt. % and HFO-1234ze may be provided in an amount from greater than about 0 wt. % to about 40 wt. %. In further aspects, such as when the composition is used as a component to retrofit an existing system used for CFC-114, HFO-1233zd is provided in an amount from about 60 wt. % to about 85 wt. % and HFO-1234ze is provided in an amount from about 15 wt. % to about 40 wt. %. In further aspects. HFO-1233zd is provided in an amount from about 65 wt. % to about 85 wt. % and HFO-1234ze is provided in an amount from about 15 wt. % to about 35 wt. %, and in even further aspects. HFO-1233zd is in an amount from about 70 wt. % to about 85 wt. % and HFO-1234ze is provided in an amount from about 15 wt. % to about 30 wt. %. In further aspects, such as when the composition is used as a component for a new system replacing an existing CFC-114-based system, HFO-1233zd may be provided in an amount from about 85 wt. % to about or less than 100 wt. % and HFO-1234ze is provided in an amount from greater than 0 wt. % to about 15 wt. %.

In further preferred aspects, HFO-1233zd, and in certain embodiments HFO-1233zd(E), is provided alone or in combination with HFC-134a. In such aspects, HFO-1233zd may be provided in an amount from about 60 wt. % to less than about 100 wt. % and HFC-134a may be provided in an amount from greater than about 0 wt. % to about 40 wt. %. In further aspects, such as when the composition is used as a component to retrofit an existing system used for CFC-114. HFO-1233zd is provided in an amount from about 60 wt. % to about 85 wt. and HFC-134a is provided in an amount from about 15 wt. % to about 40 wt. %. In further aspects, HFO-1233zd is provided in an amount from about 65 wt. % to about 85 wt. % and HFC-134a is provided in an amount from about 15 wt. % to about 35 wt. %, and in even further aspects. HFO-1233zd is in an amount from about 70 wt. % to about 85 wt. % and HFC-134a is provided in an amount from about 15 wt. % to about 30 wt. %. In further aspects, such as when the composition is used as a component for a new system replacing an existing CFC-114-based system, HFO-1233zd may be provided in an amount it from about 85 wt. % to about or less than 100 wt. % and HFC-134a is provided in an amount from greater than 0 wt. % to about 15 wt. %.

In certain preferred aspects, HFC-245fa is provided alone or in combination with HFO-1234ze. In such aspects. HFC-245fa may be provided in an amount from about 60 wt. % to less than about 100 wt. % and HFO-1234ze may be provided in an amount from greater than about 0 wt. % to about 40 wt. %. In further aspects, such as when the composition is used as a component to retrofit an existing system used for CFC-114, HFC-245fa is provided in an amount from about 60 wt. % to about 87 wt. % and HFO-1234ze is provided in an amount from about 13 wt. % to about 40 wt. %. In further aspects, HFC-245fa is provided in an amount from about 60 wt. % to about 85 wt. % and HFO-1234ze is provided in an amount from about 15 wt. % to about 40 wt. %, and in even further aspects, HFC-245fa is in an amount from about 70 wt. % to about 85 wt. % and HFO-1234ze is provided in an amount from about 15 wt. % to about 30 wt. %. In further aspects, such as when the composition is used as a component for a new system replacing an existing CFC-114-based system, HFC-245fa may be provided in an amount from about 85 wt. % to about or less than 100 wt. % and HFO-1234ze is provided in an amount from greater than 0 wt. % to about 15 wt. %.

In even further preferred aspects, HFC-245fa is provided alone or in combination with HFC-134a. In such aspects, HFC-245fa may be provided in an amount from about 60 wt. % to less than about 100 wt. % and HFC-134a may be provided in an amount from greater than 0 wt. % to about 40 wt. %. In further aspects, such as when the composition is used as a component to retrofit an existing system used for CFC-114, HFC-245fa is provided in an amount from about 60 wt. % to about 87 wt. % and HFC-134a is provided in an amount from about 13 wt. % to about 40 wt. %. In further aspects. HFC-245th is provided in an amount from about 60 wt. % to about 85 wt. % and HFC-134a is provided in an amount from about 15 wt. % to about 40 wt. %, and in even further aspects, HFC-245fa is in an amount from about 70 wt. % to about 85 wt. % and HFC-134a is provided in an amount from about 15 wt. % to about 30 wt. %. In further aspects, such as when the composition is used as a component for a new system replacing an existing CFC-114-based system, HFC-245fa may be provided in an amount from about 85 wt. % to about or less than 100 wt. % and HFC-134a is provided in an amount from greater than 0 wt. % to about 15 wt. %.

In further aspects of the invention, Applicants have surprisingly and unexpectedly found that the compositions of the present invention result in a capacity, efficiency, and glide that are similar to CFC-114 or within a commercially tolerable deviation. The compositions of the present invention are also advantageous as having low GWP. By way of non-limiting example, the following Table A illustrates the substantial GWP superiority of certain compositions of the present invention, which are described in parenthesis in terms of weight fraction of each component, in comparison to the GWP of CFC-114, which has a GWP of 10,000.

TABLE A

| Group | Name | Composition | GWP | GWP % R410A |
|---|---|---|---|---|
|  | R-114 |  | 10000 |  |
| A | A1 | 1233zd(E)/R1234ze (0.85/0.15) | 6 | 0.06% |
|  | A2 | 1233zd(E)/R1234ze (0.95/0.05) | 6 | 0.06% |
|  | 1233zd(E) | 1233zd(E) (1.0) | 6 | 0.06% |
| B | B1 | 1233zd(E)/R134a (0.90/0.10) | 148 | 1.48% |
|  | B2 | 1233zd(E)/R134a (0.95/0.05) | 77 | 0.77% |
| C | C1 | R245fa/R1234ze (0.85/0.15) | 876 | 8.76% |
|  | C2 | R245fa/R1234ze (0.95/0.05) | 979 | 9.79% |
| D | D1 | R245fa/R134a (0.85/0.15) | 1090 | 10.9% |
|  | D2 | R245fa/R134a (0.95/0.05) | 1050 | 10.5% |
|  | R-245fa | R-245fa (1.0) | 1030 | 10.3% |

The compositions of the present invention may include other components for the purpose of enhancing or providing certain functionality to the composition, or in some cases to reduce the cost of the composition. For example, heat transfer compositions which include the preferred compositions of the present invention as a refrigerant, especially as a refrigerant used in vapor compression systems, will also include one or more lubricants, generally in amounts of from about 30 to about 50 percent by weight of the entire heat transfer composition, and in some case potentially in amount greater than about 50 percent and other cases in amounts as low as about 5 percent by weight of the entire heat transfer composition.

Applicants have found that Polyol Esters (POEs) and Poly Vinyl Ethers (PVEs), PAG oils, silicone oil, lubricants that have been used in refrigeration machinery with previously used hydrofluorocarbon (HFC) refrigerants may, in certain embodiments, be used to advantage in the heat transfer compositions of the present invention. Commercially available esters include neopentyl glycol dipelargonate, which is available as Emery 2917 (registered trademark) and Hatcol 2370 (registered trademark). Other useful esters include phosphate esters, dibasic acid esters, and fluoroesters. Preferred lubricants include POEs and PVEs. Of course, different mixtures of different types of lubricants may be used.

Heat Transfer Methods and Systems

The present methods, systems and compositions are thus adaptable for use in connection with a wide variety of heat transfer systems in general and heat pump systems in particular, the present invention includes medium to high temperature heat pump systems. Non-limiting examples of such systems include medium heat pump systems having a condensing temperature of greater than 60° C., and preferably from 70° C. to 100° C. High temperature heat pump systems include those having condensing temperature greater than 100° C. Examples of such systems include, but are not limited to those used as replacements for boilers by the industry. Typical examples include water-to-water heat pumps for shopping centers. They can also be used in the oil or mining industry where heat source is readily available. The compressor is usually of centrifugal type, but other types like screw are also used. The heat exchangers can be direct expansion shell-tube type or flooded shell tube type. The compositions of the present invention are not limited to such systems and may be used in any heat transfer system originally designed for use with an HCFC or CFC refrigerant such as, for example, CFC-114.

The preferred compositions of the present invention tend to exhibit many of the desirable characteristics of CFC-114 but have a GWP that is substantially lower than that of CFC-114 while at the same time having a capacity, efficiency and glide that is substantially similar to or substantially matches, and preferably is as high as or higher than CFC-114. In particular, applicants have recognized that certain preferred embodiments of the present compositions tend to exhibit relatively low global warming potentials ("GWPs"), preferably less than about 10,000, preferably not greater than 5,000, and more preferably not greater than about 1,500. In certain preferred embodiments, the compositions may exhibit a GWP of less than 1,000, in certain embodiments, less than 500, in further embodiments less than 250, and in even further embodiments less than 150.

As mentioned above, the present invention achieves exceptional advantages in connection with medium to high temperature heat pinup systems. Non-limiting examples of such systems are provided in the Examples below. To this end, such systems may include high temperature heat pump applications (Example 1). The examples below provide typical conditions and parameters for high temperature heat pumps but does not limit the application of these blends in high for medium) temperature heat pump systems. To this end, these conditions are not considered limiting to the invention, as one of skill in the art will appreciate that they may be varied based on one or more of a myriad of factors, including but not limited to, ambient conditions, intended application, time of year, and the like. Such examples are also not necessarily limiting to the definition of the term "medium temperature heat pump system" or "high temperature heat pump system." The compositions provided herein may be Used in Similar type systems or, in certain embodiments, in any alternative system Where CFC-114 is or may be adapted for use as a heat transfer composition.

It is contemplated that in certain embodiments the present invention provides retrofitting methods which comprise replacing at least a substantial portion of the heat transfer fluid (including the refrigerant and optionally the lubricant) in an existing system with a composition of the present invention, without substantial modification of the system. In certain preferred embodiments the replacement step is a drop-in replacement in the sense that no substantial redesign of the system is required and no major item of equipment needs to be replaced in order to accommodate the composition of the present invention as the heat transfer fluid. In certain preferred embodiments, the methods comprise a drop-in replacement in which the capacity of the system is at least about 70%, preferably at least about 85%, even more preferably at least about 90%, and even more preferably at least about 95% of the system capacity prior to replacement, and preferably not greater than about 130%, even more preferably less than about 115%, and even more preferably less than about 110%. In certain preferred embodiments, the methods comprise a drop-in replacement in which the efficiency (COP) of the system is at least about 70%, more preferably at least about 90% and even more preferably at least about 95% of the system prior to replacement and preferably not greater than about 130%, even more preferably less than about 115, and even more preferably at or less than about 110%. In certain preferred embodiments, methods comprise a drop-in replacement in which the temperature glide, i.e. the difference between the starting and ending temperatures of a phase-change process by the composition within heat transfer system, is less than about 5° C., in certain aspects less than about 4° C., in further aspects is less than about 3° C., and in certain aspects is less than about 2° C.

In certain other preferred embodiments, the compositions of the present invention may be used in heat pump or refrigerant systems containing a lubricant such as polyester oils, and the like, or may be used with other lubricants traditionally used with CFC or HCFC refrigerants, as discussed in greater detail above. As used herein, the term "heat pump system" refers generally to any system or apparatus, or any part or portion of such a system or apparatus, which consists of compressor, expansion device and heat exchangers. This system would provide heat through the condenser. The compressor can be of centrifugal, screw and positive displacement type whereas the heat exchangers can be of dry expansion or flooded type. Expansion valves can be electronic or thermostatic as needed by the specifics of the design. This description does not limit any possible variances coining from specific applications.

As used herein the term "refrigeration system" refers generally to any system or apparatus, or any part or portion of such a system or apparatus, which employs a refrigerant to provide heating or cooling. Such air refrigeration systems include, for example, air conditioners, domestic refrigerators, supermarket refrigeration, chillers, or any of the systems identified herein or otherwise known in the art.

EXAMPLES

The following examples are provided for the purpose of illustrating the present invention but without limiting the scope thereof.

Example 1

New Systems

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A high temperature heat pump system for heating water is provided. In the case of such a system illustrated in this Example, the condenser temperature is set to 110° C., which generally corresponds to a water temperature of about 90° C. The degree of subcooling at the expansion device inlet is set to 10° C. The evaporating temperature is set to 25° C. The degree of superheat at evaporator outlet is set to 15° C. The compressor isentropic efficiency is set to 85% and volumetric efficiency is set to 100%. The pressure drop and heat transfer in the connecting lines (suction and liquid lines) are considered negligible, and heat leakage through the compressor shell is ignored. Several operating parameters are determined for the compositions identified in Table 1 in accordance with the present invention, and these operating parameters are reported in Table 2 below, based upon CFC-114 having a COP value of 100%, a capacity value of 100% and a discharge temperature of 110.5° C.

TABLE 1

| Group | Name | Composition | |
|---|---|---|---|
| A | A1 | 1233zd(E)/R1234ze | 0.85/0.15 |
|   | A2 | 1233zd(E)/R1234ze | 0.95/0.05 |
|   | 1233zd(E) |  | 1.00 |
| B | B1 | 1233zd(E)/R134a | 0.90/0.10 |
|   | B2 | 1233zd(E)/R134a | 0.95/0.05 |
| C | C1 | R245fa/R1234ze | 0.85/0.15 |
|   | C2 | R245fa/R1234ze | 0.95/0.05 |
| D | D1 | R245fa/R134a | 0.85/0.15 |
|   | D2 | R245fa/R134a | 0.95/0.05 |
|   | R245fa |  | 1.00 |

TABLE 2

| Group | Name | GWP | Evaporator Glide (° C.) | Capacity (%) | COP (%) | Discharge Temp. (° C.) |
|---|---|---|---|---|---|---|
|   | R-114 | 10000 | 0.0 | 100% | 100% | 110.5 |
| A | A1 | 6 | 1.8 | 91% | 111% | 122.9 |
|   | A2 | 6 | 0.6 | 83% | 112% | 121.2 |
|   | 1233zd(E) | 6 | 0.0 | 79% | 113% | 120.2 |
| B | B1 | 148 | 2.5 | 93% | 111% | 125.8 |
|   | B2 | 77 | 1.2 | 86% | 112% | 123.2 |
| C | C1 | 876 | 2.0 | 101% | 104% | 120.1 |
|   | C2 | 979 | 0.7 | 91% | 106% | 117.6 |
| D | D1 | 1090 | 2.1 | 104% | 105% | 120.1 |
|   | D2 | 1050 | 0.7 | 92% | 106% | 118.1 |
|   | R245fa | 1030 | 0 | 86% | 106% | 116.1 |

As can be seen from the Table 2 above, applicants have found that the compositions of the present invention are capable of at once achieving many of the important performance parameters sufficiently close to the parameters for R-114 to permit such compositions to be used as in new high temperature heat pump systems. For example, compositions in groups A-D exhibit capacities in this high temperature heat pump system that are within about 25%, and even more preferably within about 15% of that of R-114. All these blends efficiencies (COP) higher that R-114 by as much as 10% which is very desirable. The compositions in groups A-D exhibit evaporator glide less than about 2° C. and about 10° C. higher discharge temperatures both of which are very useful for high temperature heat pump applications. Especially in view of the improved GWP of compositions in group A-D, these compositions of the present invention are excellent candidates for use in new equipment for high temperature heat pump applications. Further compositions in group A-B present a very low GWP less than 150 which provides additional advantage.

Those skilled in the art will appreciate that the present compositions are capable of providing the substantial advantage of a refrigerant with low GWP and superior efficiency for use in new or newly designed refrigeration systems, including preferably, high temperature heat pump systems.

Example 2

Retrofit Systems

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of high temperature heat pump systems, including particularly high temperature heat pump systems containing or designed to contain R114 refrigerant, it is important in certain embodiments that such systems are capable of exhibiting reliable system operating parameters with drop-in refrigerants. Such operating parameters include:

Evaporator glide that is within about 4° C., and even more preferably within about 3° C. This parameter is important in such embodiments because it allows the use of existing heat exchangers.

System capacity that is greater than about 100%, and even more preferably more than about 110% of the system capacity using R114. This parameter is important in such embodiments because it allows the use of existing heat exchangers with these new refrigerants with glide.

System efficiency that is greater than about 100% of the system efficiency using R114. This parameter is important in such embodiments because it maintains the same energy cost associated with operation of these systems.

Discharge Temperature that is preferably lower than about 130° C. and even more preferably lower than about 125° C. The advantage of such a characteristic is that it permits the use of existing equipment without activation of the thermal protection aspects of the system, which are preferably designed to protect compressor components. This parameter is advantageous in that it avoids the use of costly controls such as liquid injection to reduce discharge temperature.

The above-noted and other operating parameters are determined for the compositions in groups E-H identified in Table 3 below in accordance with the present invention, and these operating parameters is reported in Table 4 below:

TABLE 3

| Group | Name | Composition | |
|---|---|---|---|
| E | E1 | 1233zd(E)/R1234ze | 0.65/0.35 |
|   | E2 | 1233zd(E)/R1234ze | 0.75/0.25 |
| F | F1 | 1233zd(E)/R134a | 0.83/0.17 |
|   | F2 | 1233zd(E)/R134a | 0.85/0.15 |
| G | G1 | R245fa/R1234ze | 0.60/0.40 |
|   | G2 | R245fa/R1234ze | 0.85/0.15 |
| H | H1 | R245fa/R134a | 0.70/0.30 |
|   | H2 | R245fa/R134a | 0.87/0.13 |

TABLE 4

| Group | Name | GWP | Evaporator Glide (° C.) | Capacity (%) | COP (%) | Discharge Temp. (° C.) |
|---|---|---|---|---|---|---|
|   | R-114 | 10000 | 0.0 | 100% | 100% | 110.5 |
| E | E1 | 6 | 3.8 | 109% | 107% | 125.6 |
|   | E2 | 6 | 2.9 | 99% | 109% | 124.4 |
| F | F1 | 248 | 4.1 | 103% | 110% | 128.7 |
|   | F2 | 220 | 3.7 | 100% | 110% | 128.0 |
| G | G1 | 620 | 4.0 | 127% | 99% | 124.0 |
|   | G2 | 876 | 2.0 | 101% | 104% | 120.1 |
| H | H1 | 1150 | 3.9 | 124% | 103% | 126.8 |
|   | H2 | 1082 | 1.8 | 101% | 105% | 121.2 |

In certain preferred embodiments the replacement step is a drop-in replacement in the sense that no substantial redesign or modification of the system is required and no major item of equipment needs to be replaced in order to accommodate the refrigerant of the present invention. That is the case with the compositions in groups E-H, which in general can be used in most retrofit procedures without any change of major components. In all compositions in groups E-H, the system capacity and efficiency are similar or better than R114. The evaporator glide for all compositions in groups E-H is less than about 4° C. and therefore they can be used in most existent high temperature heat pump systems.

Although the invention has been described with reference to preferred embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed, but that the invention will include all embodiments falling within the scope of the appended claims or any claims later added.

What is claimed is:

1. A high temperature heat pump system comprising a compressor, an evaporator, and a condenser operating at a condenser temperature of greater than 100° C., wherein a heat transfer composition flows through the system, the heat transfer composition comprising a refrigerant having a global warming potential (GWP) of not greater than about 150 and comprising:
   from about 60% to about 85% by weight of HFO-1233zd, wherein said HFO-1233zd consists essentially of HFO-1233zd(E); and
   from about 10% to about 40% by weight of HFO-1234ze, wherein said HFO-1234ze consists essentially of HFO-1234ze(E);
   provided the refrigerant has: (1) a capacity of at least about 90% relative to CFC-114 in said high temperature heat pump system; (2) a COP of at least about 95% relative to CFC-114 in said high temperature heat pump system; and (3) a glide of less than about 3° C. in said high temperature heat pump system.

2. The high temperature heat pump of claim 1 wherein said refrigerant comprises from about 15 wt. % to about 40 wt. % of HFO-1234ze.

3. The high temperature heat pump of claim 1 wherein said refrigerant comprises from about 65 wt. % to about 85 wt. % of HFO-1233zd and from about 15 wt. % to about 35 wt. % of HFO-1234ze.

4. The high temperature heat pump of claim 1 wherein said refrigerant comprises from about 70 wt. % to about 85 wt. % of HFO-1233zd and from about 15 wt. % to about 30 wt. % of HFO-1234ze.

5. The high temperature heat pump of claim 1 wherein said refrigerant comprises from about 85 wt. % to about 95 wt. % of HFO-1233zd and from about 5 wt. % to about 15 wt. % of HFO-1234ze.

6. A high temperature heat pump system comprising a compressor, an evaporator, and a condenser operating at a temperature of greater than 100° C., wherein a heat transfer composition flows through the system, the heat transfer composition comprising refrigerant having a global warming potential (GWP) of not greater than about 150 and comprising from about 60% to about 90% by weight of transHFO-1233zd; and from greater than about 0% to about 15% by weight of HFC 134a; provided that the refrigerant has: (1) a capacity of at least about 90% relative to CFC-114 in said high temperature heat pump system; (2) a COP of at least about 95% relative to CFC-114 in said high temperature heat pump system; and (3) a glide of less than about 3° C. in said high temperature heat pump system.

7. A method of transferring heat to or from a fluid or body in the high temperature heat pump system of claim 6 by
causing a phase change in said refrigerant at a temperature of greater than 100° C.

8. A method of transferring heat to or from a fluid or body in the high temperature heat pump system of claim 1 by causing a phase change in said refrigerant at a temperature of greater than 100° C.

9. The system of claim 1 wherein said HFO-1233zd consists of HFO-1233zd(E).

10. The system of claim 9 wherein said HFO-1234ze consists of HFO-1234ze(E).

11. The system of claim 6 wherein said HFO-1233zd consists of HFO-1233zd(E).

* * * * *